United States Patent Office 3,261,871
Patented July 19, 1966

3,261,871
REDUCTION OF PHOSPHINE OXIDES
Hans Fritzsche, Siegburg, Ulrich Hasserodt, Menden, and Friedrich W. A. G. K. Korte, Hangelar, Germany, assignors to Shell Oil Company, New York, N.Y., a corporation of Delaware
No Drawing. Filed Dec. 10, 1964, Ser. No. 417,489
Claims priority, application Germany, May 16, 1964, S 91,131
17 Claims. (Cl. 260—606.5)

This invention relates to a process for the preparation of phosphines and particularly tertiary phosphines. More specifically, the invention relates to the preparation of tertiary phosphines by reduction of the corresponding phosphine oxides.

A number of methods have been described in the prior art for the reduction of phosphines oxides to phosphines. Reduction of tertiary phosphine oxide to the corresponding tertiary phosphines is possible by the use of lithium aluminum hydride or calcium aluminum hydride. However, this method, although successful with trialkylphosphine oxides, results in a conversion of triaryl phosphine oxides to the corresponding diarylphosphine. It is also possible to convert triphenylphosphine oxide to triphenylphosphine dichloride and then reduce the dichloride with sodium in the presence of toluene, lithium aluminum hydride or Raney Nickel to the corresponding phosphine. Still another method which has met with limited success is the conversion of triphenylphosphine oxide to triphenylphosphine sulfide and subsequent reduction with lithium aluminum hydride to the triphenyl phosphine. However, none of the above methods have proved to be entirely satisfactory and commercially feasible.

Copending applications U.S. Serial No. 297,965, filed July 26, 1963, and U.S. Serial No. 268,476, filed March 27, 1963, have provided improved methods for reducing phosphine oxides to the corresponding phosphines by reaction of the aforesaid oxide with certain inorganic and organic silicon compounds containing one or more Si—H bonds.

It is a principal object of the present invention to provide not only an efficient and economical method for reducing phosphine oxides to the corresponding phosphines but also to provide one having advantages over the methods of the aforementioned copending applications.

These objects will be better understood and others will become apparent from the description of the invention as given hereinafter.

Now, in accordance with this invention, it has been found that tertiary phosphine oxides can be reduced to corresponding tertiary phosphines by reaction with certain inorganic and organic silicon compounds, containing at least one silicon atom bonded to both a hydrogen and a halogen atom, and a tertiary amine.

The inorganic and organic silicon compounds which are useful in the process of our invention are any such compound containing at least the moiety

where X represents halogen. The middle halogens, chlorine and bromine, are preferred. The moiety

may be connected to any other combination or configuration of atoms, the moiety itself being the only critical feature of the reagent. It may be connected to monomeric or polymeric groups, aromatic or aliphatic groups, hydrocarbyl or hetero-substituted hydrocarbyl groups, hydrogen, halogen, or other inorganic elements. Conveniently, the moiety may be attached to aryl, alkyl, alkoxy, hydrogen or chlorine. Representative examples of useful silicon compounds comprise hydrocarbylhalosilanes, e.g., phenyldichlorosilane, ethyldibromosilane, ethyldichlorosilane, chlorodiethylsilane; hydrocarbyloxyhalosilanes, e.g., ethoxydichlorosilane, chlorodiethoxysilane; unsubstituted halosilanes, e.g., chlorosilane, dichlorosilane, trichlorosilane; and the like. An especially preferred reagent is trichlorosilane, $SiHCl_3$.

Suitable tertiary amines which are useful in the process of the invention include trialkylamines, dialkylarylamines such as dialkylanilines, and heterocyclic amines such as pyridine and alkylpyridines; tertiary amines, either mono-, di- or polyamines, of only C, H and N atoms are especially useful. Representative examples of useful tertiary amines include trimethylamine, triethylamine, triisopropylamine, methyldiethylamine, dimethylbenzylamine, N,N-dimethylaniline, pyridine, 1,2-dimethylpyridine ($\alpha$-lutidine), 1,3-dimethylpyridine ($\beta$-lutidine), 2,4-dimethylpyridine (2,4-lutidine), 2,6-dimethylpyridine (2,6-lutidine), 4-ethyl-2-methylpyridine ($\alpha$-collidine), 3-ethyl-4-methylpyridine ($\beta$-collidine), 2,4,6-trimethylpyridine ($\gamma$-collidine), 3,5-dimethyl-4-ethylpyridine, and the like. The tertiary amine should be of a sufficiently basic nature, preferably possessing an ionization constant, in aqueous medium at 25° C., of at least about $1 \times 10^{-9}$ and greater, i.e., a pK of at most about 9 and less.

In the aforesaid copending applications, the amount of silicon material operable in reducing the phosphine oxide, in terms of mol units of Si—H moiety, was from 1 to 4 mol units of Si—H for each mol of phosphine oxide. We now find that unexpectedly one-half that amount of silicon material, in terms of mol units of

moiety, can reduce the phosphine oxide in the same yield provided that the aforementioned tertiary amines are substituted for the omitted half of the silicon material. Hence, we find that, for each mole of phosphine oxide, reduction can now be accomplished with from 0.5 to 2 mol units of

together with 0.5 to 2 mols of tertiary amine. Optimum yields of tertiary phosphine are obtained in the reduction when there is used 0.7 to 1.5 mol units of each of the two reagents, i.e.,

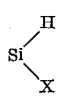

and tertiary amine, per mol of phosphine oxide. Preferably the tertiary amine should be present in slight excess. Therefore a preferred range of reagen concentration may be expressed as from 0.7 to 1.5 mol units of

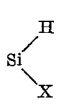

and from 0.8 to 1.7 mols of tertiary amine per mol of phosphine oxide.

It is preferred that the silicon compound boil at substantially higher temperatures, say 20–30° C. higher, than the phosphine which is being formed. Although it is preferred to use liquid silicon compounds, solids are acceptable especially when combined with a solvent.

Various tertiary phosphine oxides, generally of from 3 to 60 carbon atoms, may be converted according to the process of this invention into tertiary phosphines, particularly trihydrocarbon phosphine oxides, including trialkyl, tricycloalkyl, trialkenyl, tricycloalkenyl, triaryl, trialkaryl and triaralkyl phosphine oxides and corresponding mixed trihydrocarbon phosphine oxides. Preferably the hydrocarbon groups contain no non-aromatic unsubstitution and when aromatic are mononuclear. The invention is especially useful for reducing tertiary aryl phosphine oxides, expecially triarylphosphine oxides, such as triphenylphosphine oxide, to corresponding phosphines. In general, the tertiary phosphine oxides may be represented by the formula RR'R''PO, wherein R, R' and R'' are independently selected organic groups bonded to the P by a P—C bond; R and R' taken together may also form a ring, as for instance, in phospholine oxides of the formula

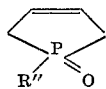

Although the aforesaid R, R', and R'' are preferably hydrocarbyl groups and preferably of from 1 to 20 carbon atoms, they may contain substituents, for example, amino, amido, alkoxy, alkylthio, or acyl groups.

The reduction of the phosphine oxide is effected at temperatures from 20° C. upwards, generally above 50° C. When trichlorosilane is the reducing material, it has been found that temperatures of from 50° C. to 250° C. may be advantageously employed, although temperatures above 250° C. are also within the scope of the invention.

A reaction time of at least 30 minutes and up to 5 hours is generally sufficient with 1 to 3 hours usually being preferred.

Although atmospheric pressure is usually preferred, the pressure, through the use of a closed container, can be varied considerably without adversely affecting the reaction.

A solvent is not necessary for completion of the reaction, but the inclusion of inert organic solvents such as ethers may under certain circumstances be desirable and even produce a greater yield of phosphine and minimize the decomposition of the phosphine oxide to other products. For example, excellent results are obtained with such materials as naphthalene, benzene, toluene, diethylene glycol dimethyl ether, glycol diethyl ether, and diphenyl oxide. Although the amount of solvent is not in any way critical, from about 0.5 to 4 parts by weight for every part by weight of phosphine oxide is suitable with equal parts by weight usually preferred.

At the completion of the reduction process and prior to the isolation of the desired phosphine, the reaction mass is usually treated with alkali, such as caustic soda solution, calcium hydroxide, sodium carbonate, and the like. Conveniently, aqueous alkali in a 2- to 10-fold excess may be added and the resulting organic and aqueous phases separated. The phosphine product may be obtained from the separated organic phase by any convenient method, such as distillation, crystallization, adduct formation and precipitation, and the like. If desired, the tertiary amine reagent may be recovered for reuse. Extraction with aqueous acid solution of the aforementioned organic phase prior to isolation of the phosphine removes the tertiary amine. It may then be easily recovered by standard methods as demonstrated hereinbelow in certain of the examples.

The following specific examples of the invention will serve to illustrate more clearly the application of the invention, but they are not to be construed as in any manner limiting the invention thereto:

*Example I*

14 grams (0.05 mol) of triphenylphosphine oxide were dissolved in 50 ml. of benzene. To this solution were added 6 g. (0.055 mol) of triethylamine and 7.5 g. (0.055 mol) of trichlorosilane. The solution was subsequently heated under reflux for two hours. After the solution was cooled, 50 ml. of 30% aqueous NaOH solution was added. The resulting organic phase was separated, washed with water and dried. The solvent was removed by distilling at reduced pressure and the residue was recrystallized from methanol. Triphenylphosphine, M.P. 80° C., was obtained in a yield of 11.2 g. (85% of theory).

*Example II*

14 grams (0.0475 mol) of tricyclohexylphosphine oxide, 5 g. (0.055 mol) of triethylamine and 7.5 g. (0.055 mol) of trichlorosilane were dissolved in 150 ml. of absolute benzene and heated under reflux for two hours. Subsequently, 100 ml. of 20% aqueous NaOH solution was added. The resulting organic phase was separated and washed twice with oxygen-free water. After being dried, the benzene solution was treated with carbon disulfide. The resulting tricyclohexylphosphine carbon disulfide adduct precipitated, was filtered by suction, and washed with a small quantity of benzene. All operations were carried out in an inert atmosphere, i.e., under nitrogen. The adduct, M.P. 116° C., was obtained in a yield of 12.6 g. (75% of theory). The phosphine is readily recovered from the adduct by adding, under nitrogen, alcohols, such as methanol, and subsequently removing the alcohol by distillation.

*Example III*

21.8 grams (0.1 mol) of tri-n-butylphosphine oxide, 14.9 g. (0.11 mol) of trichlorosilane and 11 g. (0.11 mol) of triethylamine, together with 100 ml. of benzene, were heated under reflux for 2 hours. Subsequently, 100 ml. of 30% aqueous NaOH solution was added; the resulting organic phase was separated, washed with water, dried and fractionally distilled. 18.7 grams of tri-n-butylphosphine distilled at 111° C. (14 mm. Hg), corresponding to 92.5% of theoretical yield.

*Example IV*

36.8 grams (0.1 mol) of tri-p-methoxyphenylphosphine oxide, 14.9 g. (0.11 mol) of trichlorosilane and 11 g. (0.11 mol) of triethylamine, together with 100 ml. of benzene, were heated under reflux for two hours. The reaction mixture was subsequently treated with 100 ml. of 20% aqueous NaOH solution; the resulting organic phase was separated, washed and dried. After the solvent had been removed by distillation under reduced pressure, fine crystals remained, which were recrystallized from ethanol. Tri - p - methoxyphenylphosphine, M.P. 135° C., was obtained in a yield of 23 g. (65% of theory).

*Example V*

27.8 grams (0.1 mol) of triphenylphosphine oxide, 12.1 g. (0.11 mol) of N,N-dimethylaniline and 15 g. (0.11 mol) of trichlorosilane, together with 300 ml. of benzene, were heated under reflux for two hours. Subsequently, 100 ml. of 20% aqueous NaOH solution was added dropwise; the resulting organic phase was separated and shaken with dilute hydrochloric acid. The hydrochloric acid extract was rendered alkaline and shaken with benzene. After separation and evaporation of the benzene, 11.6 g. (96% of theory) of N,N-dimethylaniline remained. The organic phase was concentrated and the resulting residue recrystallized from methanol. Triphenylphosphine, M.P. 80° C., was obtained in a yield of 21 g. (80% of theory).

We claim as our invention:

1. The process of converting tertiary phosphine oxide to the corresponding phosphine by reacting the tertiary phosphine oxide in the presence of a tertiary amine with a silicon compound containing at least one

moiety, X represents halogen.

2. The process in accordance with claim 1 wherein the silicon compound is an inorganic halosilane.
3. The process in accordance with claim 1 wherein the silicon compound is an organic halosilane.
4. The process in accordance with claim 2 wherein the silicon compound is a chlorinated silane.
5. The process in accordance with claim 4 wherein the silicon compound is trichlorosilane.
6. The process in accordance with claim 3 wherein the silicon compound is a hydrocarbylhalosilane.
7. The process in accordance with claim 6 wherein the silicon compound is phenyldichlorosilane.
8. The process in accordance with claim 1 wherein the tertiary amine is a trialkylamine.
9. The process in accordance with claim 1 wherein the tertiary amine is a pyridine containing only C and H atoms besides the pyridine N-heteroatom.
10. The process in accordance with claim 1 wherein the tertiary amine is a dialkylaniline.
11. The process in accordance with claim 8 wherein the tertiary amine is triethylamine.
12. The process in accordance with claim 10 wherein the tertiary amine is N,N-dimethylaniline.
13. The process in accordance with claim 1 wherein the tertiary phosphine oxide is a triarylphosphine oxide.
14. The process in accordance with claim 13 wherein the tertiary phosphine oxide is triphenylphosphine oxide.
15. The process in accordance with claim 1 wherein the reaction is effected at a temperature of from 50° C. to 250° C.
16. The process in accordance with claim 1 wherein the number of mol units of

moiety of the silicon compound present is in a ratio of 0.5 to 2:1 to the mols of phosphine oxide and the number of mols of tertiary amine present is in a ratio of 0.5 to 2:1 to the mols of phosphine oxide.

17. The process in accordance with claim 16 wherein the number of mol units of

moiety of the silicon compound present is in a ratio of 0.7 to 1.5:1 to the mols of phosphine oxide and the number of mols of tertiary amine present is in a ratio of 0.8 to 1.7:1 to the mols of phosphine oxide.

No references cited.

TOBIAS E. LEVOW, *Primary Examiner.*

W. F. BELLAMY, *Assistant Examiner.*